(12) United States Patent
Sato

(10) Patent No.: US 7,379,734 B2
(45) Date of Patent: *May 27, 2008

(54) MOBILE COMMUNICATION TERMINAL, GAME SERVER AND GAME PROGRAM

(75) Inventor: Kazunobu Sato, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,492

(22) Filed: Sep. 3, 2004

(65) Prior Publication Data

US 2005/0054378 A1 Mar. 10, 2005

(30) Foreign Application Priority Data

Sep. 3, 2003 (JP) .......................... P2003-311623
Aug. 16, 2004 (JP) .......................... P2004-236733

(51) Int. Cl.
*H04M 3/00* (2006.01)
(52) U.S. Cl. ..................... 455/418; 455/415; 463/39; 463/40
(58) Field of Classification Search ............... 455/418, 455/415; 463/39, 40
See application file for complete search history.

(56) References Cited

U.S. PATENT DOCUMENTS 6,524,189 B1  2/2003  Rautila 6,554,707 B1 *  4/2003  Sinclair et al. ............... 463/39

FOREIGN PATENT DOCUMENTS

JP  2002-281566  9/2002

* cited by examiner

*Primary Examiner*—Lester G. Kincaid
*Assistant Examiner*—Charles Shedrick
(74) *Attorney, Agent, or Firm*—Leydig, Voit & Mayer, Ltd.

(57) ABSTRACT

A mobile communication terminal includes a wireless communication device for wireless communication, an image displaying device for displaying an image, and a sound outputting device for outputting sound. The mobile communication terminal generates an execution variable that changes progression of a game being played by a user of the mobile communication terminal, through the mobile communication terminal, the execution variable being calculated based, at least in part, on incoming communications history data. The incoming communications history data lists data characterizing each of a number of previous incoming communications to the wireless communication device. The terminal executes the game using the generated execution variable.

11 Claims, 16 Drawing Sheets

| PORTABLE TERMINAL CODES | INCOMING HISTORY NUMBER | INCOMING DATES AND TIMES | CALLERS' TELEPHONE NUMBERS |
|---|---|---|---|
| 0001 | 1 | 2003.07.11.14:00 | 090-1234-222* |
| 0001 | 2 | 2003.07.11.15:30 | 090-2222-111* |
| 0001 | 3 | 2003.07.15.09:11 | 090-1234-222* |
| ... | ... | ... | ... |
| 0001 | 20 | 2003.07.17.19:21 | 090-1234-222* |
| ... | ... | ... | ... |
| 0002 | 1 | 2003.07.12.10:00 | 090-8888-999* |
| 0002 | 2 | 2003.07.12.16:00 | 090-7777-888* |
| 0002 | 3 | 2003.07.14.15:00 | 090-8888-999* |
| ......... | ......... | ......... | ......... |
| 0002 | 20 | 2003.07.18.10:00 | 090-8888-999* |
| ......... | ......... | ......... | ......... |

44a / 44b / 44c / 44d

INCOMING HISTORY DATA STORING PART — 44

*Fig.10*

CHOOSE A GAME

1. FORTUNE TELLING GAME

2. PET RAISING GAME

3. RPG

4. SHOOTING GAME

5. MATCH-UP GAME

MOBILE COMMUNICATION TERMINAL, GAME SERVER AND GAME PROGRAM

CROSS REFERENCE TO RELATED APPLICATIONS

This application is based upon and claims the benefit of priority from the prior Japanese Patent Application No. 2003-311623, filed on Sep. 3, 2003; 2004-236733, filed on Aug. 16, 2004 the entire contents of which are incorporated herein by reference.

This application is related to co-pending U.S. patent application entitled "GAMING MACHINE, GAME SUPPLYING SYSTEM AND GAME PROGRAM" referred to as the prior Japanese Patent Application No. 2003-311629, filed in Japan on Sep. 3, 2003; 2004-236736, filed in Japan on Aug. 16, 2004. The co-pending application including specification, drawing and claims are expressly incorporated herein by reference in its entirety.

BACKGROUND OF THE INVENTION

1. Field of the Invention

The present invention relates to a mobile communication terminal, a game server, and a game program, which have a constitution for changing an operation in response to an incoming history.

2. Related Background Art

Some mobile communication terminals, such as a cellular phone, a PHS (Personal Handy Phone System) and the like, heretofore have not only a mobile communication function performed via a base station, but also a function accompanied with the communication such as a function for changing ringing tones and image to be displayed in a waiting time (standby image) and the like. Also, some mobile communication terminals have a function for acquiring a program and data from a server via the Internet and thereby executing a game, and a function for transmitting and receiving an e-mail. Among this type of mobile communication terminals, there have been ones which include a function by which a progress of game changes depending on a present position of the user (for example, see Japanese Patent Laid-open No. 2002-281566).

SUMMARY OF THE INVENTION

Since the mobile communication terminal is capable of performing communications while making a movement, there are some cases that a position at which a game is played changes due to a user's movement while carrying a mobile communication terminal with him/her. In such cases, a progress of game can be changed by the aforementioned conventional mobile communication terminal.

However, a mobile communication terminal merely device that communications can be performed while a user is moving. A user does not always move while performing a mobile communication. Depending on a user, a position where communications are usually performed may remain almost unchanged, for example at the user's home or at a favorite tea lounge. In addition, in some cases, a user stays at a certain position without moving when the user is too absorbed in playing a game. In these cases, a present position remains almost unchanged. As long as conventional communication terminals are concerned, consequently, an operation which is to depend on a present position remains fixed. If the operation relates to a game, it makes it impossible to change a progress of game, and it deprives the game of fun.

With this taken into account, the present invention has been made in order to solve the aforementioned problem. An object of the present invention is to provide a mobile communication terminal, a game server, and a game program, which have a constitution for causing a progress of game to change and enabling a user to play an amusing game, even if a present position of the user remains unchanged.

In order to solve the aforementioned problem, a mobile communication terminal according to the present invention, which includes wireless communication device for making wireless communications, an image displaying device for displaying an image and sound outputting device for outputting a sound, the mobile communication terminal comprises: execution variable generating unit for generating an execution variable in order to change a progress of game by use of incoming history data indicating a history of incomings which have been received by the wireless communication device; and game executing unit for executing a game by use of the execution variable generated by the execution variable generating unit.

Since the mobile communication terminal executes the game by use of the incoming history data which is to be updated from time to time, and whose update timing is irregular, this mobile communication terminal can change a progress of game flow to an extent of being unpredictable even if the mobile communication terminal remains at a certain position.

In addition, the mobile communication terminal may further comprise incoming history data storing device for storing an incoming history data and extracting unit for extracting incoming history data which satisfy a predetermined condition out of incoming history data stored in the incoming history data storing device, and the execution variable generating unit may generate the execution variable by use of the incoming history data extracted by the extracting unit.

This mobile communication terminal stores incoming history data, and generates an execution variable by use of incoming history data which satisfy a predetermined condition out of the stored incoming history data. For this reason, a progress of game flow can be changed to an extent of being unpredictable even if the number of incomings is large.

The execution variable generating unit may be configured to generate an execution variable by use of a plurality of variables which are generated through such a procedure that at least one of the plurality of variables is random.

In addition, with regard to this mobile communication terminal, it is preferable that the game executing unit may comprise generating unit for generating, by the execution variable, fortune telling data indicating a result of a fortune telling, and changing unit for making an instruction for changing the displaying of an image in image displaying device or a sound output in sound outputting device by the fortune telling data generated by the generating unit.

In this case, the mobile communication terminal can execute a fortune telling game whose flow changes based on incoming history data.

Furthermore, the game executing unit may comprise generating unit for generating, by an execution variable, raising data for determining growth contents of an object to be raised, and changing unit for making an instruction for changing the displaying of an image in the image displaying device by the raising data which have been generated by the generating unit.

In this case, the mobile communication terminal can execute a raising game whose progress changes based on incoming history data.

It is preferable that any one of the aforementioned mobile communication terminals further comprises standby image changing unit which changes the displaying of images in the image displaying device during standby for waiting for an incoming by use of the extracted incoming history data.

This mobile communication terminal can change the displaying of images during standby for waiting for an incoming based on incoming history data.

The present invention provides a game server supplying a game to a mobile communication terminal connected via the Internet, the game server comprising: acquiring device for acquiring incoming history data indicating a history of incoming to the mobile communication terminal; extracting unit for extracting incoming history data satisfying a predetermined condition out of incoming history data which have been acquired by the acquiring device; execution variable generating unit for generating an execution variable for changing a progress of game by use of the incoming history data which have been extracted by the extracting unit; and supplying device for executing a game by use of the execution variable which has been generated by the execution variable generating unit, and for supplying a result of the execution to the mobile communication terminal.

According to this game server, even if a mobile communication terminal remains at a certain position, a game which is so varied that a progress of game is unpredictable can be executed in the mobile communication terminal.

Additionally, the present invention provides a carrier wave encoding a sequence of instructions for executing a game in a mobile communication terminal comprising wireless communication device for making wireless communications, an image displaying device for displaying an image and sound outputting device for outputting a sound, when executed by the mobile communication terminal, cause the mobile communication terminal to perform the steps of:

extracting incoming history data, which satisfy a predetermined condition, out of incoming history data indicating a history of incomings which have been received by said wireless communication device;

generating an execution variable to change a progress of game by use of said incoming history data; and executing a game by use of an execution variable.

By storing this carrier wave in a mobile communication terminal or by supplying this carrier wave from a server to the mobile communication terminal, a game which is so varied that the progress of game is unpredicted can be executed in the mobile communication terminal even if the mobile communication terminal remains at a certain position.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 10 is a view showing an example of a screen displaying a menu for games.

DESCRIPTION OF THE PREFERRED EMBODIMENTS

A description will be provided below for embodiments of a mobile communication terminal, a game server and a game program according to the present invention with reference to drawings.

Figure 1:
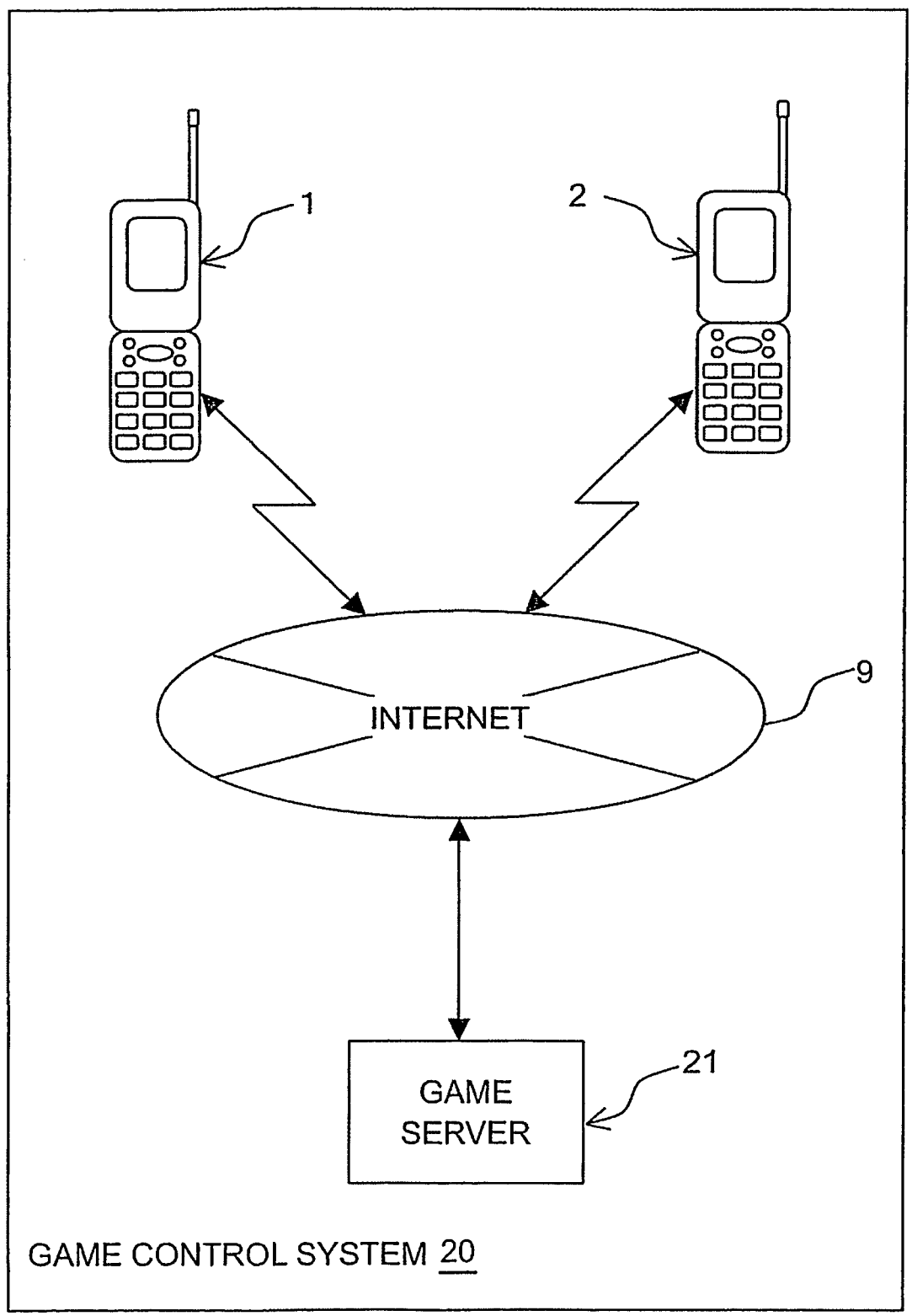
FIG. 1 is a system constitution diagram of an overall game control system including a portable terminal according to an embodiment of the present invention.

Here, FIG. 1 is a system consttion diagram of an overall game control system including a mobile communication terminal according to the present embodiment.

First Embodiment

As shown in FIG. 1, a game control system 20 includes two portable terminals 1 and 2 as cellular phones and the like which can perform an i-mode (a registered trademark) and a game server 21 (hereinafter referred to as a "server") with which the portable terminals 1 and 2 are connected via the Internet 9.

Figure 2:
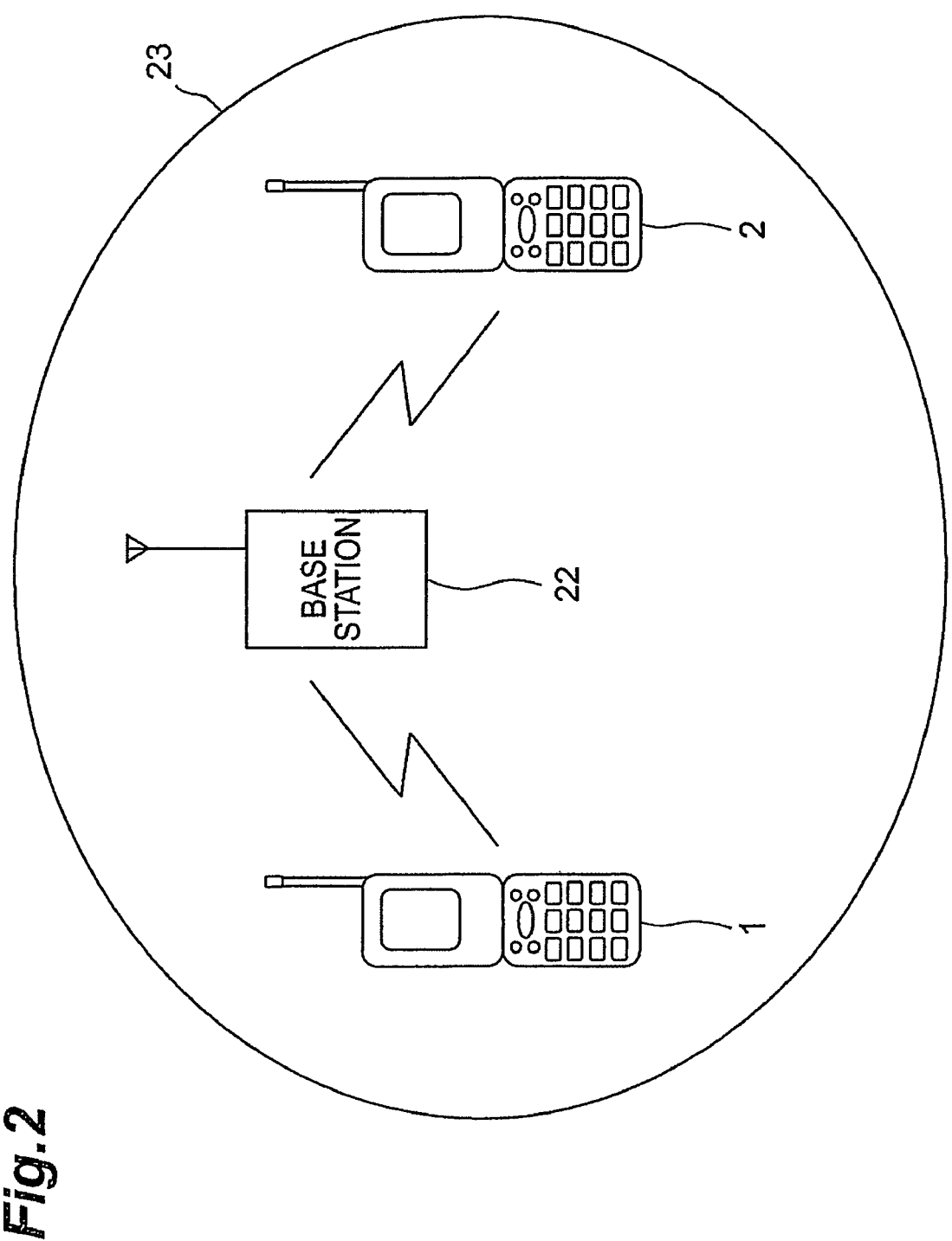
FIG. 2 is a system constitution diagram of a mobile communication system including each portable terminal shown in FIG. 1 and a base station.

The portable terminals 1 and 2 are mobile communication terminals according to the present invention. The portable terminals 1 and 2 make communications with the server 21 via the Internet 9, and can execute a variety of games supplied from the server 21. In addition, as shown in FIG. 2, the portable terminals 1 and 2 exist in a wireless communication zone 23 covered by a base station 22 which is established within a paging area under the control of a mobile telephone switching office, not illustrated, and thereby constitutes a mobile communication system. The portable terminals 1 and 2 make wireless communications with the base station 22, and sound communications are made therebetween.

Figure 3:
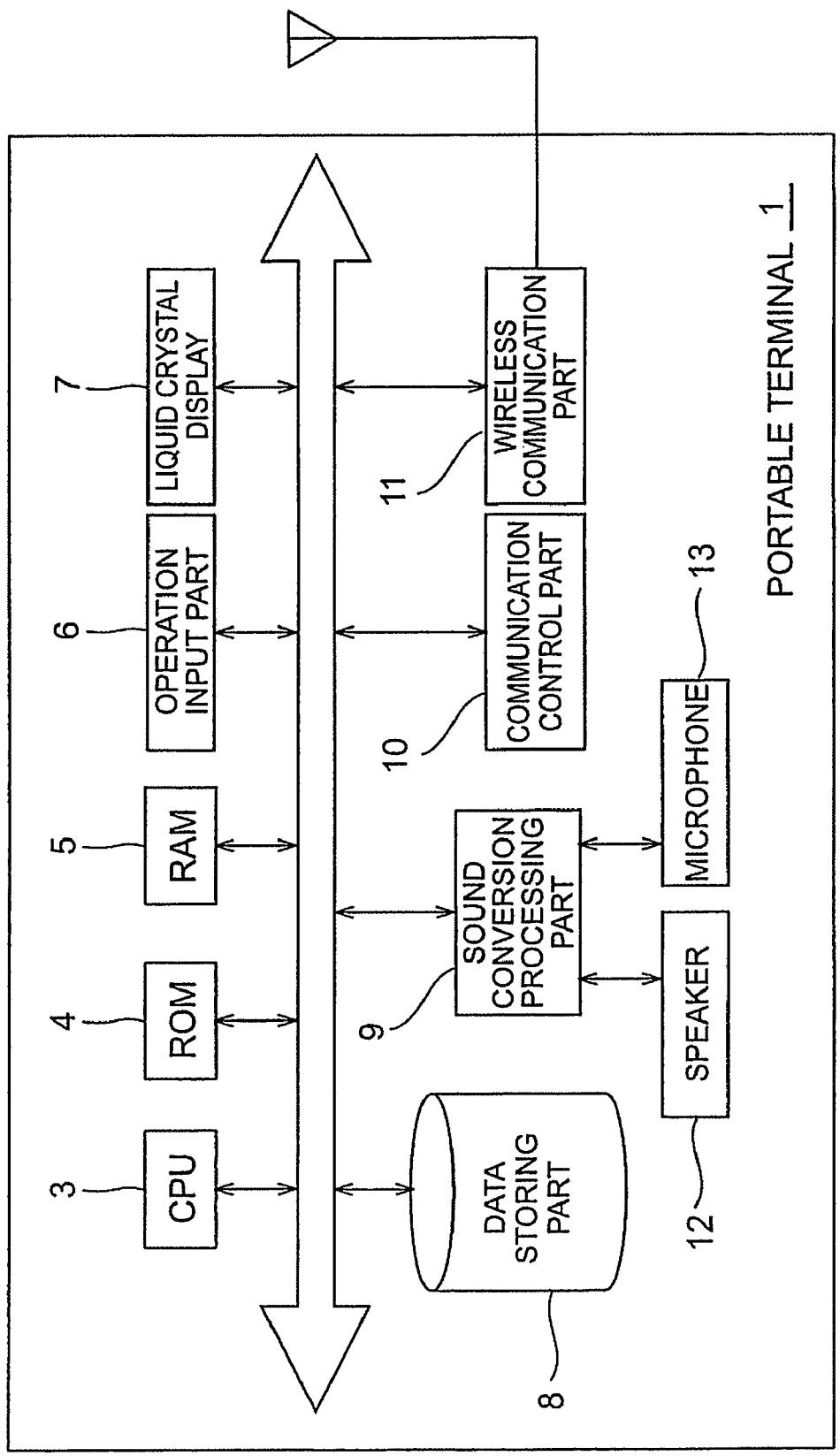
FIG. 3 is a block diagram showing a constitution of the portable terminal shown in FIG. 1.

As shown in FIG. 3, the portable terminal 1 includes a CPU (Central Processing Unit) 3, a ROM (Read Only Memory) 4, a RAM (Random Access Memory) 5, an operation input part 6, and a liquid crystal display 7. The portable terminal 1 further includes a data storing part 8, a sound conversion processing part 9, a communication control part 10, and a wireless communication part 11, a speaker 12 and a microphone 13.

The CPU 3 operates in accordance with a program stored in the ROM 4. The CPU 3 performs control operations of the entire portable terminal 1, and operates as each unit which is a feature of the present invention. The ROM 4 stores a program to be executed by the CPU 3. For example, the ROM 4 stores a communication control program for causing the portable terminal 1 to make a wireless communication, and a game control program for controlling the execution of the game. The RAM 5 stores data needed for the execution of a program by the CPU 3.

The operation input part 6 has a plurality of operation input buttons, and inputs to the CPU 3 data inputted through input manipulations of each of the operation input buttons. For example, the operation input part 6 has a plurality of character input buttons, a button for sending a call, a button for receiving a call, an operation button for confirming an incoming e-mail, an operation button for connecting to the Internet 9 and the like. The liquid crystal display 7 has an LCD (Liquid Crystal Display) and its driving unit, and is image displaying device for displaying images such as a character, a figure, a symbol and the like. For example, the liquid crystal display 7 displays images such as a telephone number of a counterpart of the user when a call is placed, a present time, an incoming history, a received e-mail, a standby image, and a game executing image to be displayed when executing various games which are supplied from the server 21.

A data storing part 8 stores various data such as game data which will be described later. In addition, an incoming history data storing part 14 which will be described later is provided to the data storing part 8. A sound conversion processing part 9 expands sound data and outputs the sound data to a speaker 12. On the other hand, the sound conversion processing part 9 converts and compresses an analogue sound signal which is inputted from the microphone 13 to digital sound data, and inputs the digital sound data into a wireless communication part 11. A communication control part 10 operates by receiving an instruction from the CPU 3, and controls a connection of a line and a cutoff thereof for the purpose of making communications with a base station 22. The wireless communication part 11 is wireless communication device for transmitting and receiving data by wireless communication in accordance with the control of the communication control part 10. In other words, information which are to be transmitted to the base station 22 are converted to signals which are handled in a mobile communication network, and thereafter are superimposed and transmitted on a radio wave. On the other hand, a radio wave is received from the base station 22, and information is extracted from signals which are superimposed on a received radio wave. The speaker 12 is sound output device for outputting a conversation of a counterpart of the user and a sound while a game is executed. The microphone 13 inputs sound such as conversation contents and the like of the user.

Figure 4:
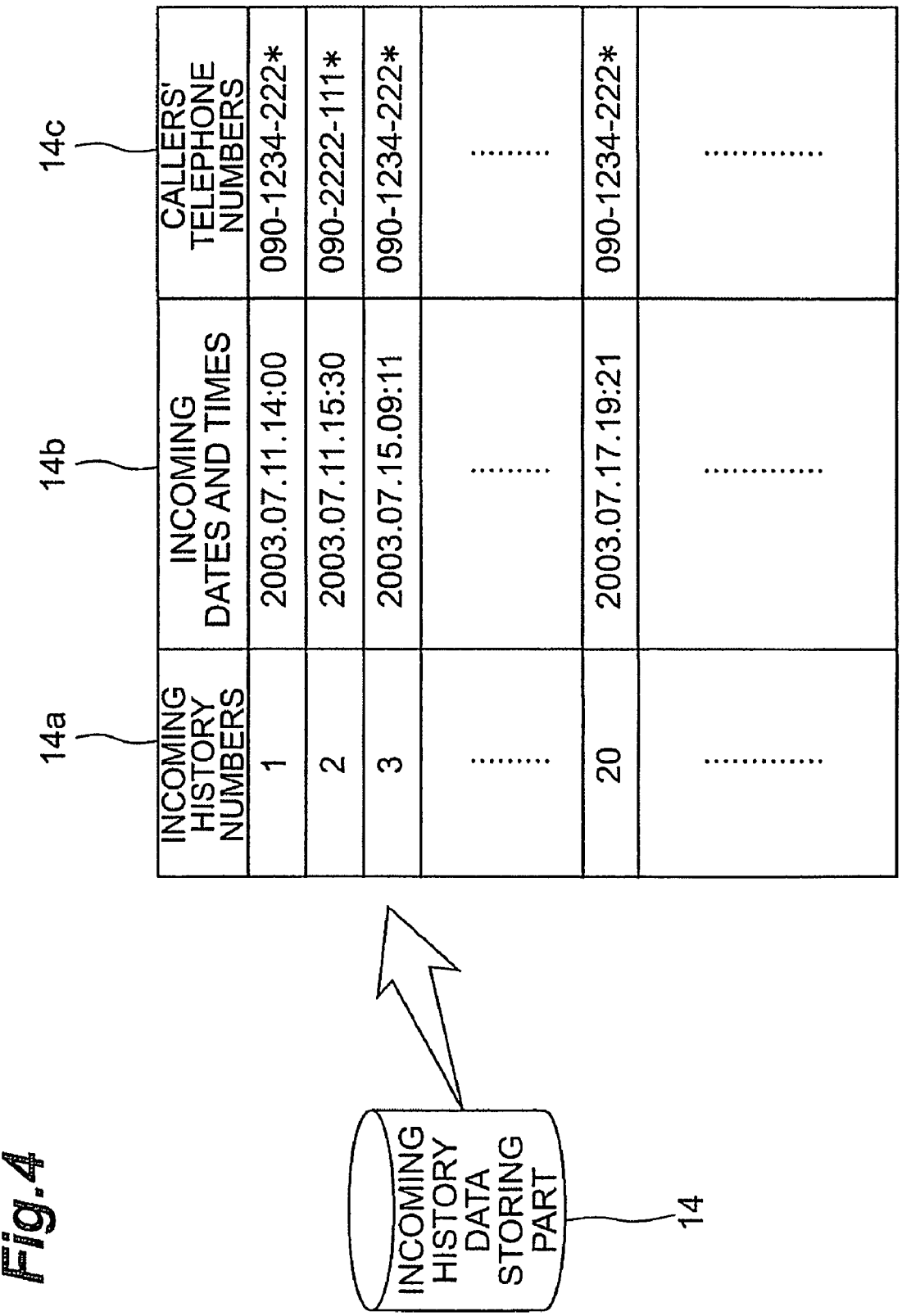
FIG. 4 is a diagram showing an incoming history data storing part and data items of incoming history data.

An incoming history data storing part 14 is incoming history data storing device for storing incoming history data indicating a history of calls which have been performed by the wireless communication part 11. As shown in FIG. 4, the incoming history data storing part 14 has incoming history numbers 14a, incoming dates and times 14b and callers' telephone numbers 14c, and those are stored in association with each other. A serial number which corresponds to the order in which the portable terminal 1 has generated each piece of incoming history data is stored in the incoming history numbers 14a. A date and time on which the portable terminal 1 has received an incoming is stored in the incoming dates and times 14b. A caller's telephone number which is informed by the base station 22 when the incoming is received is stored in the callers' telephone numbers 14c.

Figure 5:
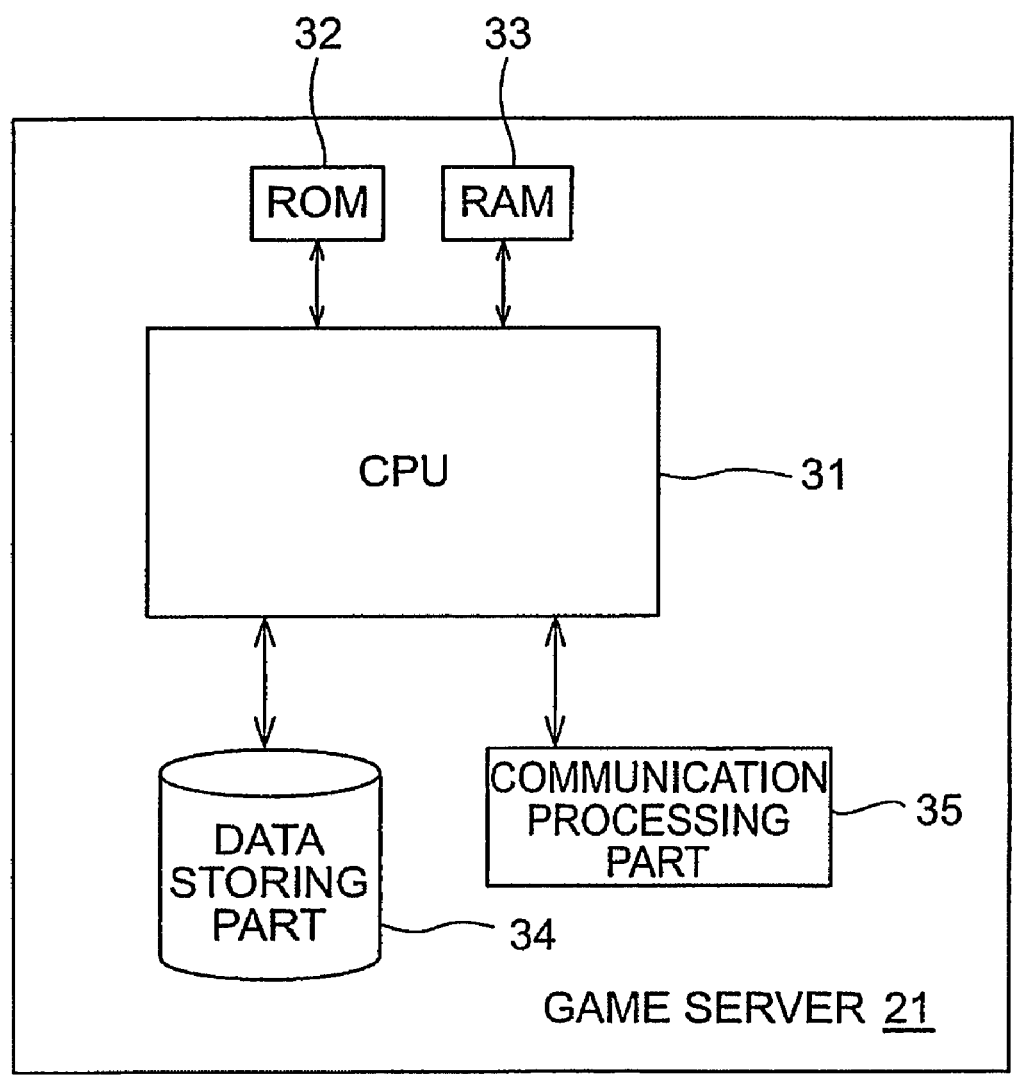
FIG. 5 is a block diagram showing a constitution of a server shown in FIG. 1.

As shown in FIG. 5, the server 21 comprises a CPU 31, a ROM 32, a RAM 33, a data storing part 34 and a communication processing part 35. The server 21 operates in accordance with a request from the portable terminal 1, and supplies a game program and data (hereinafter referred to as "game data" by putting them into a group), which are used for the executing of a game, to the portable terminal 1. In addition, the server 21 performs processes for supplying various games (for example, a fortune telling game which offers a result of a fortune telling to a user) to the user of the portable terminal 1.

The CPU 31 operates in accordance with a program which is stored in the ROM 32. The CPU 31 controls operations of the entire server 21, and operates as each unit which is a feature of the present invention. The ROM 32 stores a control program which is executed by the CPU 31 and permanent data in order to supply a game to a portable terminal 1. The RAM 33 stores data which are used when the CPU 31 operates. The data storing part 34 stores game data which is used for the executing of a game. The communication processing part 35 operates in accordance with an instruction of the CPU 31, and transmits and receives data. This communication processing part 35 operates as transmitting device for transmitting execution result data which will be described later to the portable terminal 1, and also operates as acquiring device for receiving incoming history data from the portable terminal 1 and acquiring the incoming history data.

Figure 6:
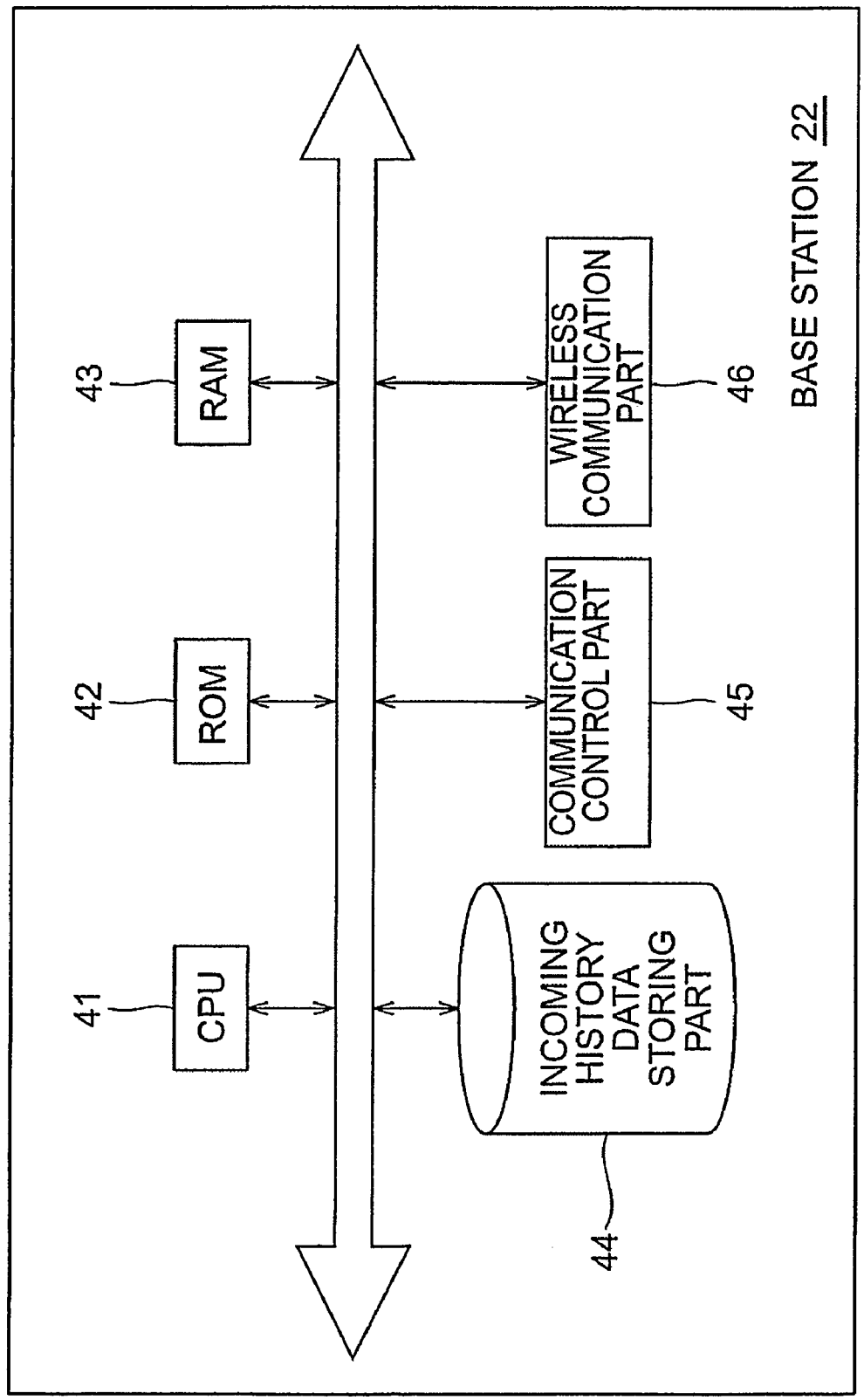
FIG. 6 is a block diagram showing a constitution of a base station shown in FIG. 2.
Figure 7:
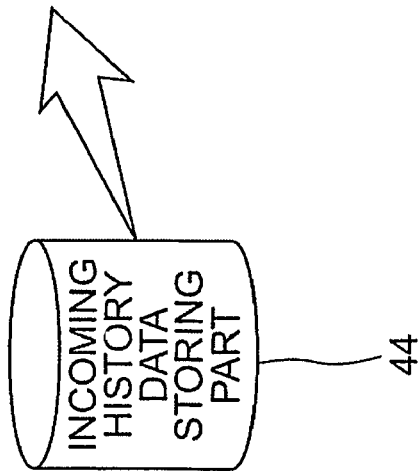
FIG. 7 is a diagram showing an incoming history data storing part which is installed in the base station, and data items of incoming history data.

As shown in FIG. 6, the base station 22 comprises a CPU 41, a ROM 42, a RA 43, an incoming history data storing part 44, a communication control part 45, and a wireless communication part 46. The CPU 41 operates in accordance with a program which is stored in the ROM 42, and controls operations of the entire base station 22. The ROM 42 stores a program which is executed by the CPU 41. The RAM 43 stores data which is needed for the executing of the program by the CPU 41. As shown in FIG. 7, the incoming history data storing part 44 stores incoming history data which are sorted for each portable terminal to be communicated with. In other words, the incoming history data storing part 44 has portable terminal codes 44a, incoming history numbers 44b, and incoming dates and times 44c and callers' telephone numbers 44d, and those are stored in association with each other. The portable terminal codes 44a stores codes to identify a portable terminal which has made wireless communications via the base station 22. The incoming history numbers 44b, the incoming dates and times 44c and the callers' telephone numbers 44d store information similar to the aforementioned incoming history numbers 14a, incoming dates and times 14b and callers' telephone numbers 14c.

Figure 8:
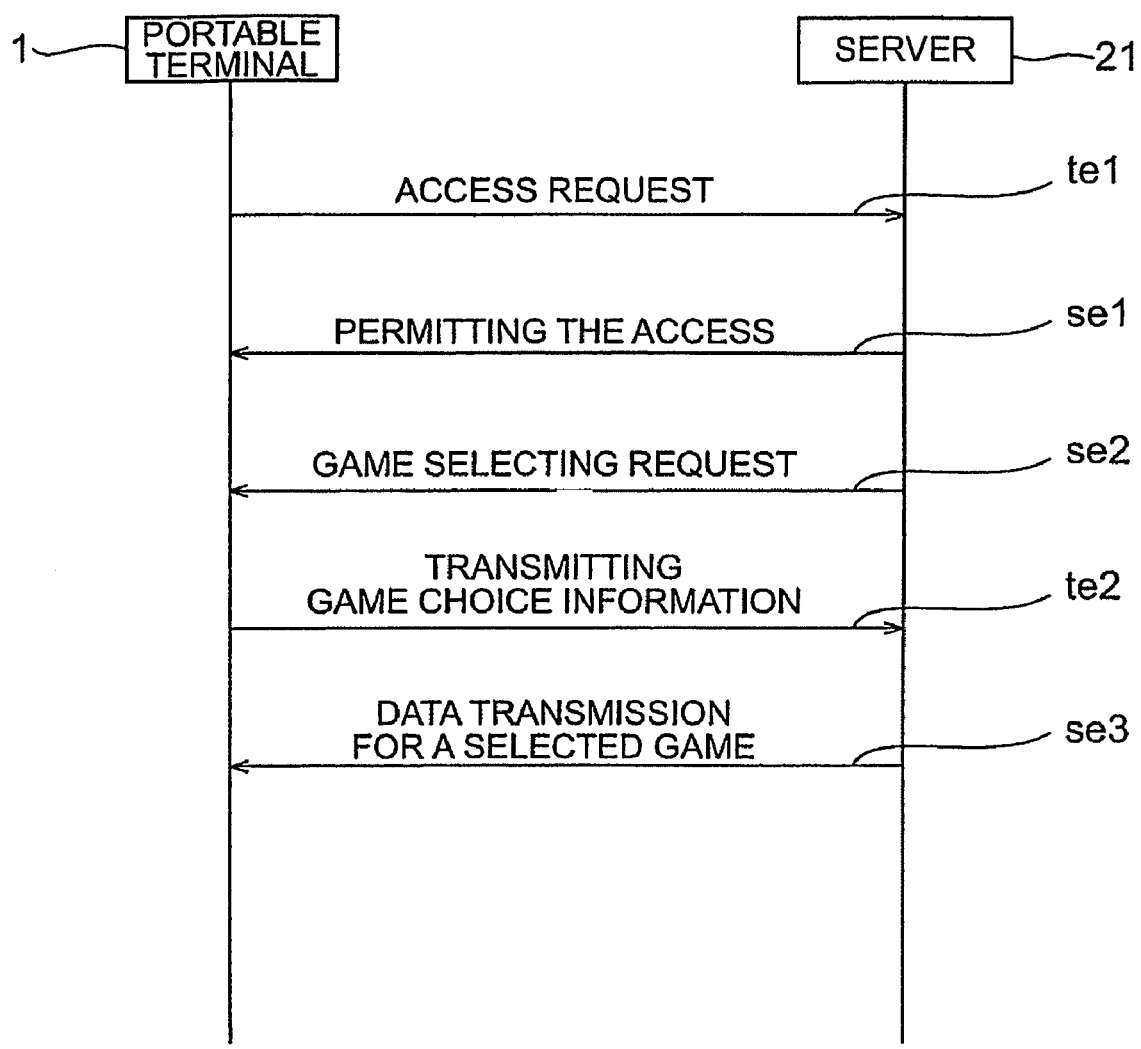
FIG. 8 is a sequence chart showing a procedure for transmitting and receiving data between the portable terminal and the server.

Next, a description will be provided for contents of operations by the game control system 20 which has the aforementioned constitution, focusing mainly on an operation procedure of the portable terminal 1. FIG. 8 is a sequence chart showing a procedure for transmitting and receiving data between the portable terminal 1 and the server 21.

First, when a user of the portable terminal 1 intends to play a game, the user accesses the server 21. In this case, the user manipulates the operation input part 6 of the portable terminal 1, thereby inputs an address of the server 21, and inputs the button for transmitting a call. Then, the CPU 3 operates in accordance with the communication control program stored in the ROM 4, and causes the communication control part 10 to operate. Subsequently, the communication control part 10 instructs the wireless communication part 11 to make a transmission te1 of an access request.

On the other hand, the server 21 stands by until an access comes from a user. Once the transmission te1 of an access request has arrived, the CPU 31 operates in accordance with a control program stored in the ROM 32, and makes a predetermined check based on data (a password, a security code and the like) which has been received with the transmission te1. When permitting an access, the CPU 31 instructs a communication processing part 35 to make a transmission se1 for permitting the access.

Subsequently, in the server 21, the CPU 31 instructs the communication processing part 35 to transmit a game selecting request se2.

Then, the portable terminal 1 receives the game selecting request se2 via the wireless communication part 11, and displays a game menu screen on the liquid crystal display 7. At this time, a game menu screen shown in FIG. 10 is displayed on the liquid crystal display 7. This game menu screen is a screen for selecting a desired game out of executable games by receiving (downloading) game data supplied from the server 21. As shown in FIG. 10, according to the present embodiment, the following 5 games are selectable: "1. fortune telling game, 2. pet raising game, 3. RPG (Role Playing Game), 4. shooting game, 5. match-up game."

When a user of the portable terminal 1 selects a desired game (in this case, it is assumed that "1. fortune telling game" is selected) while referring to the game menu screen, the CPU 3 causes the communication control part 10 to operate, and the communication control part 10 instructs the wireless communication part 11 to make a transmission te2 of game choice information for the purpose of identifying a selected game.

Subsequently, in the server 21, the CPU 31 operates by receiving the transmission te2 of the game choice information, and game data corresponding to the received game choice information is read from the data storing part 34. In order to supply the game data to the portable terminal 1, a data transmission se3 is made.

Figure 11:
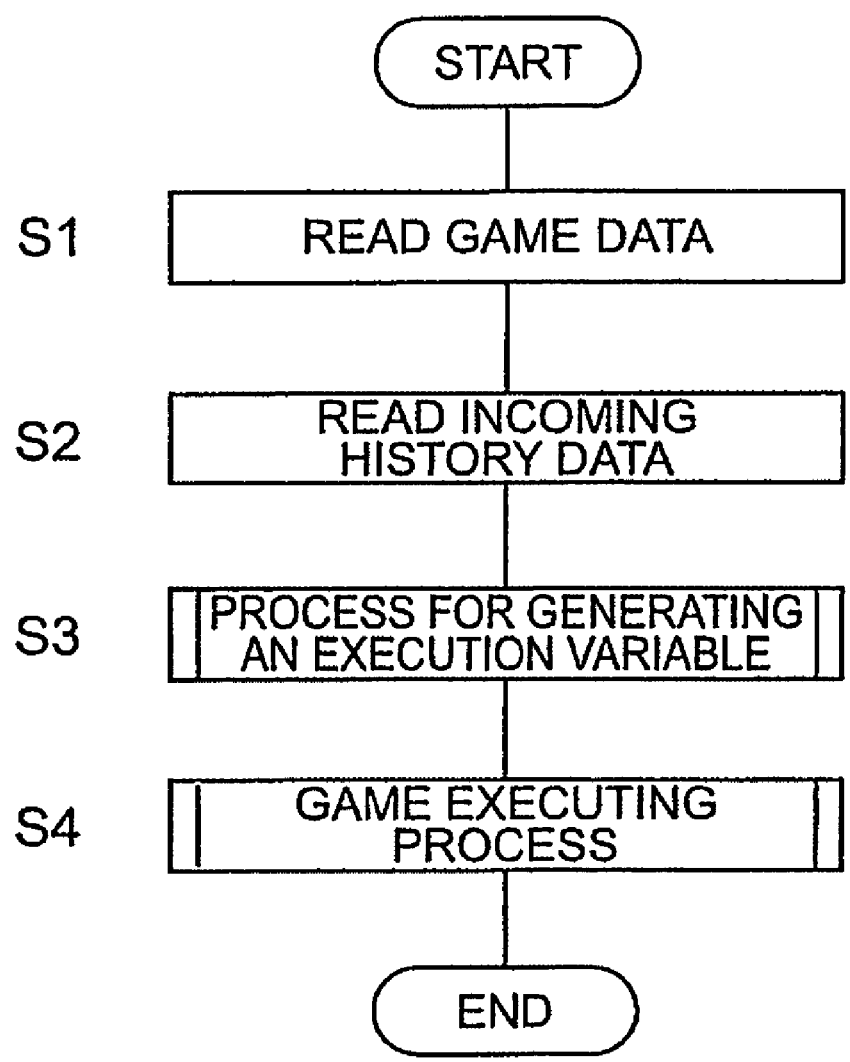
FIG. 11 is a flowchart showing, an operating sequence of a game process in the portable terminal.

In the portable terminal 1, once the transmitted game data is received from the server 21 via the wireless communication part 11, the received game data is stored in the data storing part 8. Subsequently, the CPU 3 operates in accordance with the game control program stored in the ROM 4, and starts an operation along a flowchart shown in FIG. 11. FIG. 11 is a flowchart showing an operation procedure for processing a game to be performed in the portable terminal 1. Incidentally, step is shortened as S in FIG. 1 and FIGS. 12 to 16 which will be described later.

Once the CPU 3 starts game processing in accordance with the game control program, the CPU3 proceeds to step 1. The CPU 3 accesses the data storing part 8, and performs a process for reading game data which are stored there. Subsequently, the CPU 3 proceeds to step 2. The CPU 3 accesses the incoming history data storing part 14 of the data storing part 8, and reads the stored incoming history data. Then, once the CPU 3 proceeds to step 3, the CPU 3 operates in accordance with a game program included in the game data which have been read in step 1, and performs a generating process for an execution variable. Here, the CPU 3 generates the execution variable, which will be described later, in accordance with a flowchart shown in FIG. 12.

Figure 12:
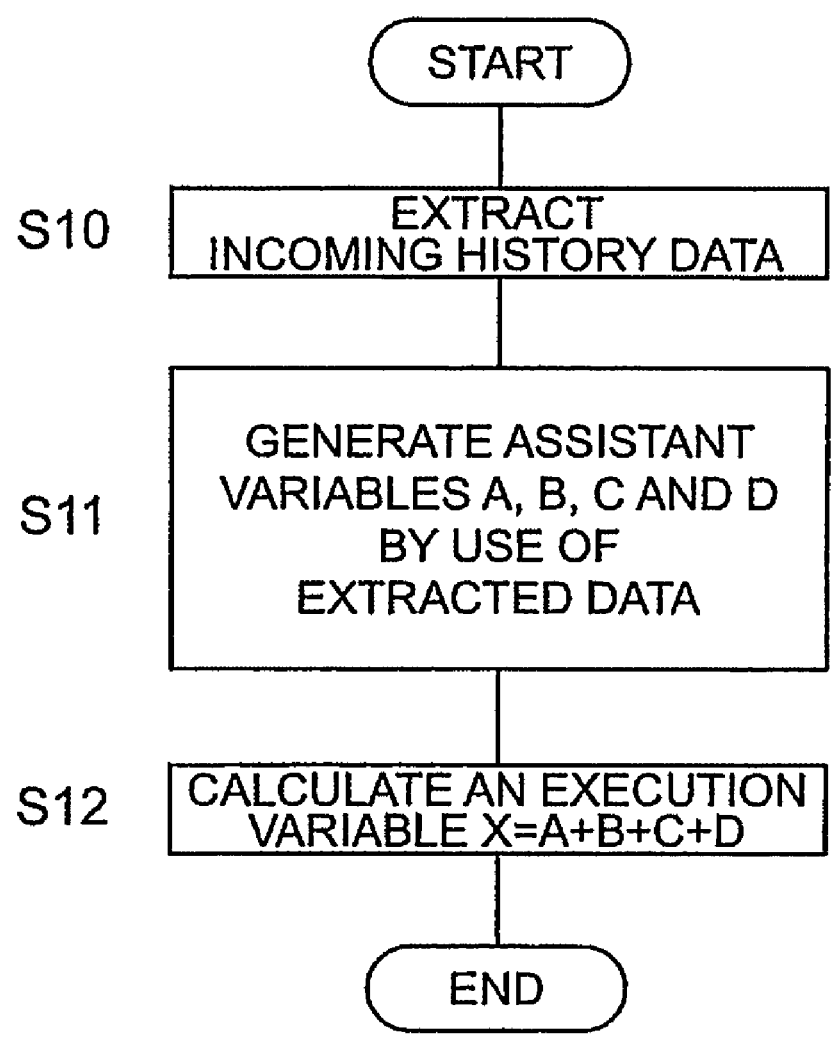
FIG. 12 is a flowchart showing an operating sequence of performing a generating process for an execution variable in the portable terminal.
Figure 13:
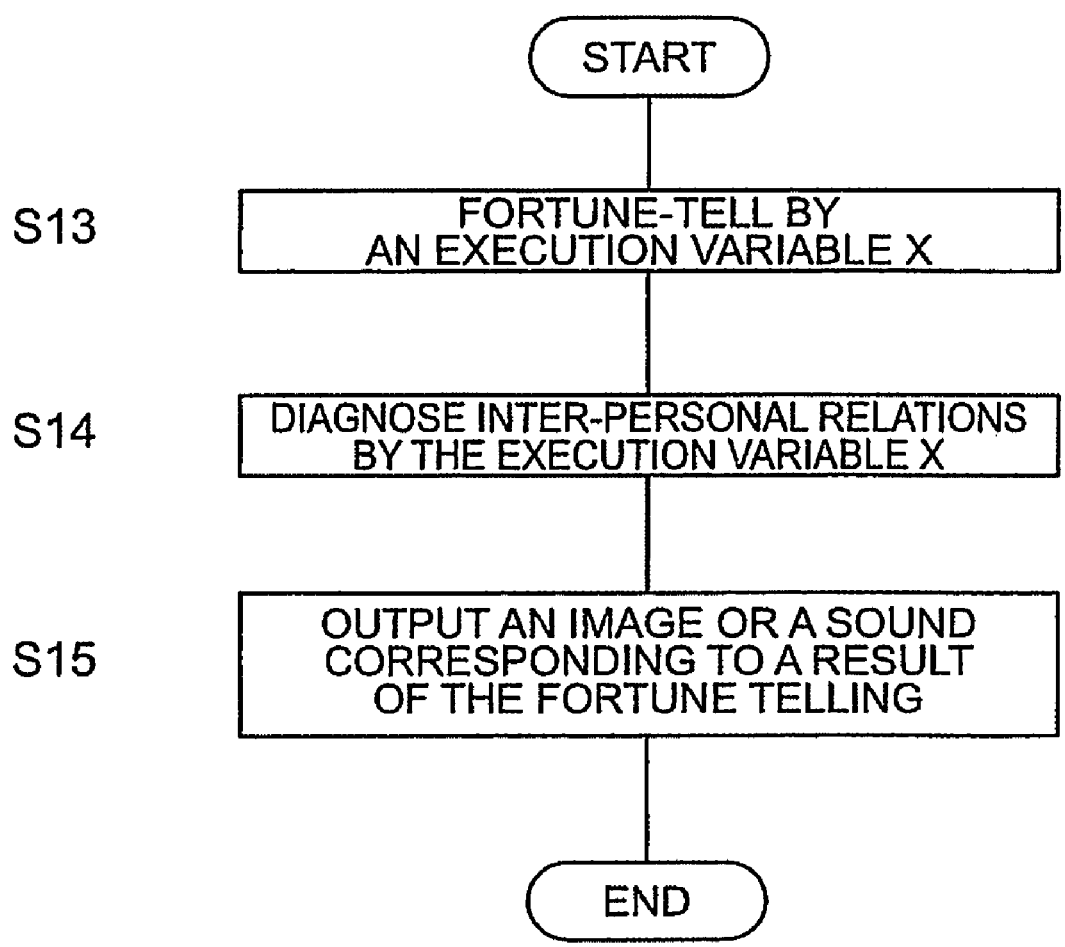
FIG. 13 is a flowchart showing an operating sequence of a game executing process to be performed in the portable terminal.

Once the CPU 3 starts the generating process for an execution variable, the CPU 3 proceeds to step 10 shown in FIG. 12. The CPU 3 operates as extraction unit, and extracts incoming history data which satisfy a predetermined condition out of the incoming history data which have been read in step 2. Various contents are conceivable as a condition for extracting incoming history data. In the present embodiment, however, as an example, last twenty pieces of incoming history data (hereinafter these twenty pieces of incoming history data are referred to as a "first object data") are extracted out of the read incoming history data in order to generate an execution variable for changing a progress of game (a fortune telling game) which a user has selected. Incidentally, a caller's telephone number ("090-1234-222*" in a case shown in FIG. 4) in the incoming history data which made the most frequent incoming in the first object data is referred to as an "extracted number."

Then, when the CPU 3 proceeds to step 11, the CPU 3 operates as execution variable generating unit, and performs the following processing prior to the generating of an execution variable. The CPU 3 finds assistant variables A, B, C and D for generating an execution variable X, on a basis of the incoming history data which have been extracted in step 10, in accordance with the following procedures 1 to 4.

The assistant variables A, B, C and D are calculated by paying attention to a character of the data included in the incoming history data which have been extracted in step 10. As is described later, since a result of executing a game is changed by an execution variable X, it is preferable that the execution variable X is caused to have irregular values (random values) in order to diversify a result of executing a game and to make a game more amusing. However, since the execution variable X is generated through a certain predetermined procedure, it is preferable that a plurality of assistant variables are prepared, which are generated through a procedure by which at least one of the plurality of assistant variables is random, and that the execution variable X is generated by use of the plurality of assistant variables. Use of such a plurality of assistant variables enables the execution variable X to have a random value if one of the plurality of assistant variables takes up a random value, even if the rest of the plurality of assistant variables take up regular values.

For this reason, in the present embodiment, the four assistant variables A, B, C and D are prepared, and each of them is generated through a procedure (the following procedures 1 to 4) by which at least one of the plurality of assistant variables is random. As long as the procedures 1 to 4 themselves are performed by the CPU 3, all the procedures are predetermined ones. However, the plurality of procedures are combined in order to make a generated assistant variable irregular.

As characteristics of data included in the incoming history data, there are ones of telephones from which a call is sent (a telephone from which a call is made is categorized into a general telephone, a cellular phone, a public telephone and an overseas telephone), a mode of displaying an incoming (whether or not it is a call with a hidden phone number), a date of an incoming, a time of an incoming. Incidentally, the below-mentioned procedures 1 to 4 are examples of procedures for generating an execution variable X, and the execution variable may be generated through different procedures. For example, a presence or absence of a call with a hidden phone number and a time of the incoming may be combined in the third procedure.

Procedure 1 (a Procedure for Finding an Assistant Variable A)

If an extracted number represents "a general telephone," a remainder is found by dividing a number, which is obtained by summing up the last four digits, by 3. Then, A is found by adding 2 to the remainder.

If an extracted number represents "a cellular phone," a remainder is found by dividing a number, which is obtained by summing up the last four digits, by 3. Then, A is defined as the remainder.

If an extracted number represents "a public telephone," a remainder is found by dividing a number, which is obtained by summing up the last four digits, by 3. Then, A is found by adding −1 to the remainder.

If an extracted number represents "any other telephone," a remainder is found by dividing a number, which is obtained by summing up the last four digits, by 3. Then, A is found by adding −2 to the remainder.

In addition, if an extracted number is a caller's telephone number whose data account for more than 10 calls in the last 20 calls, A is found by adding −2 further. A is from −4 to 4.

Procedure 2 (a Procedure For Finding an Assistant Variable B)

Callers' telephone numbers whose incoming history numbers are even are selected out of the first object data. All the fourth digits from the left of the selected callers' telephone numbers ("1" in a case of incoming history data whose caller's telephone number is "090-1234-222*") are summed up. Then, B1 is defined as a remainder which is found by dividing the sum by 6.

Callers' telephone numbers whose incoming history data are the twentieth (the date and time of the incoming is latest), the tenth, the fifth and the first in the first object data are selected. All the last digits of the selected callers' telephone numbers are summed up. Then, B2 is defined as a remainder which is found by dividing the sum by 6.

By this, B(B: 0-11) is defined as a remainder which is found by dividing the sum of B1 and B2 (B1+B2) by 12.

Procedure 3 (a Procedure For Finding an Assistant Variable C)

If the first object data includes no call with a hidden phone number but an overseas call, C is defined as "2."

If the first object data includes neither a call with a hidden phone number nor an overseas call, C is defined as "0."

If the first object data includes both a call with a hidden phone number and an overseas call, C is defined as "1."

If the first object data includes a call with a hidden phone number but no overseas call, C is defined as "−2." C is from −2 to 2.

Procedure 4 (a Procedure For Finding an Assistant Variable D)

If there are more than two missed calls, D is defined as "−3."

If there is only a missed call, D is defined as "−1."

If there is no missed call, D is defined as "0." D is from −3 to 0.

After step 11 is performed, the CPU 3 proceeds to step 12. A calculation in accordance with the below-mentioned conditional expression is made with the assistant variables A, B, C and D which have been found in step 11, and thereby an execution variable X (−9 to 17) is generated.

Conditional expression: X=A+B+C+D

Then, after step 12 is performed, the generating process for an execution variable is completed. The CPU 3 proceeds to step 4 shown in FIG. 11, and performs a game executing process along the game program. Once the CPU 3 starts the game executing process, the CPU 3 performs the process in accordance with a flowchart shown in FIG. 13. Here, a written oracle data which constitute fortune telling data indicating a result of a fortune telling is generated in accordance with the following examination procedure 1, in response to the execution variable X.

Examination Procedure 1

When the execution variable X is from −9 to −4: great misfortune.

When the execution variable X is from −3 to −1: misfortune.

When the execution variable X is from 0 to 4: good fortune.

When the execution variable X is from 5 to 9: better fortune.

When the execution variable X is from 10 to 14: the best fortune.

When the execution variable X is from 15 to 17: the very best fortune.

Next, the CPU 3 proceeds to step 14. A process for diagnosing inter-personal relations by the execution variable X is performed, and fortune telling data is generated. Here, inter-personal diagnosis data concerning inter-personal relations of a user is generated as fortune telling data in accordance with the following examination procedure 2 in response to the execution variable X.

Examination Procedure 2

A user of a telephone whose caller's telephone number has an incoming history number equal to a remainder which is found by dividing the execution variable X by 10 is a "lucky person" from a viewpoint of a user of the portable terminal 1.

A user of a telephone whose caller's telephone number has an incoming history number equal to a number which is obtained by adding 10 to a remainder which is found by dividing the execution variable X by 10 is an "unlucky person" from a viewpoint of a user of the portable terminal 1.

Then, the CPU 3 proceeds to step 15, and makes an output corresponding to a result of a fortune telling by use of the fortune telling data which has been generated in steps 13 and 14. At this time, the CPU 3 operates as changing unit, and makes an instruction for changing the displaying of images or sound outputs based on the fortune telling data. For example, the CPU 3 instructs the liquid crystal display 7 to display fortune telling data (written oracle data and inter-personal diagnosis data) on the LCD. Or else, the CPU 3 instructs the sound conversion processing part 9 to output a sound corresponding to the fortune telling data from the speaker 12. After step 15 is performed, the game process shown in FIG. 11 is completed.

As described above, in the portable terminal 1, the execution variable for changing a progress of game (a fortune telling game in the above description) is generated by use of the incoming history data. A result of the executing of a game by use of the execution variable is obtained, an image corresponding to fortune telling data indicating the result of the executing is designed to be displayed on the liquid crystal display 7 (and/or a sound is designed to be outputted from the speaker 12). Consequently, with progress contents of the game, a result of the executing of the game is designed to change in response to the incoming history data, and also displayed contents of the liquid crystal display 7 (and/or contents of a sound output of the speaker 12) is designed to change.

Subsequently, the incoming history data which change a result of the executing of a game is updated from time to time, and the update timing is also irregular. In addition, since the incoming history data are usually generated not at the will of a user of the portable terminal 1 but by an incoming from the communicating counterpart of the user, the will of the user is not reflected, and the predictability is low. In addition, even if a user continues using a portable terminal 1 while remaining at a certain position, as long as the user continues using the portable terminal 1, incoming history data is updated from time to time. For this reason, with regard to the portable terminal 1, even if the user remains at a certain position, a progress of game can be changed to an extent of being unpredictable, and consequently the game can be made amusing.

In addition, incoming history data are updated randomly, and can not be predicted. For this reason, if a match-up game is executed by use of the incoming history data, the degree of difficulty in winning the match-up game can be made higher. In addition, with regard to the incoming history data, types of the data are not restricted. For this reason, contents which vary in the game can be made wide-ranging compared to a case that determined data are used.

It should be noted that, according to the above description, since the incoming history data have been stored in the incoming history data storing part 14 and data which satisfy a predetermined condition is extracted out of them, incoming history data can be stored only in a certain amount. For this reason, even it the number of incoming per unit time is large, an execution variable is designed to be capable of being generated in accordance with a certain condition. The portable terminal 1 according to the present embodiment suffices as long as an execution variable can be generated from incoming history data. Incoming history data do not have to be stored. Ones which satisfy a predetermined condition do not have to be extracted. For example, if the number of incomings per unit time is small, an execution variable may be generated each time an incoming is received, without storing the incoming history data.

Another Example of a Game

Next, a description will be provided for a case that a user of the portable terminal 1 selectes "2. a pet raising game" referring to a game menu screen shown in FIG. 10. Incidentally, in this case, it is assumed that an image which has been taken by imaging device, which is not illustrated, is registered (hereinafter referring to this registered image as a "registered image") in the portable terminal 1. As a registered image, an image of a communicating counterpart of the user is conceivable.

In addition, when the user selectes "2. pet raising game," the portable terminal 1 receives game data from the server 21, and performs processes in the aforementioned steps 1 to 3 in accordance with the game data, through a procedure similar to the aforementioned case that "1. fortune telling game" is selected. At this time, in step 10, the CPU 3 operates as extracting unit, and extracts incoming history data which satisfy a predetermined extracting condition out of incoming history data which have been retrieved in step 2. Here, last 20 pieces of incoming history data (hereinafter referring to these 20 pieces of incoming history data as "second object data") are extracted out of incoming history data whose incoming date and time belong to a certain time span (for example, time spans between 8:00 and 9:00, between 12:00 and 13:00 and between 19:00 and 20:00) in accordance with an extracting condition for the pet raising game.

Next, in steps 11 and 12, the CPU 3 operates as execution variable generating unit, finds the assistant variables A, B, C and D, and thereby generates the execution variable X through the aforementioned procedures. Subsequently, once the CPU 3 starts a game executing process in step 4, the CPU 3 starts the process along a flowchart shown in FIG. 16, and executes the game by use of the execution variable X. At this time, in step 17, the CPU 3 chooses food corresponding to the execution variable X, and generates raising data for determining growth contents of the object to be raised. For example, if an object to be raised (a pet intended to be raised) is a dog, any one of "bread," "dog food," "fish" and "meat" is selected in response to the execution variable X, and raising data corresponding to each of them are generated.

Next, the CPU 3 proceeds to step 18, and a pet growing process is performed on a basis of the raising data which have been generated in step 17. In this case, an image data in which the degree of the growth of the pet is changed (growth image data) are generated. In other words, an image of the pet (pet image) which has been created by placing a registered image in the portion of the face of the pet is modified in response to the raising data, and is processed. The growth image data is generated in this manner. Then, the CPU 3 proceeds to step 19. The CPU 3 outputs the growth image data which have been generated in step 18 by an image display, and outputs a result of the growth (the raising of the pet). At this time, the CPU 3 operates as changing unit, and mfakes an instruction for displaying the growth image data. Then, the CPU 3 instructs the liquid crystal display 7 to display a image of the grown pet on the LCD. After step 19 is performed, a process shown in FIG. 11 is completed.

In this case, too, the execution variable is generated by use of the incoming history data, and a result of the executing of the game by use of the execution variable is obtained. The growth image data indicating the result of the executing is designed to be displayed on the liquid crystal display 7. Consequently, with progress contents of the game, a result of the executing of the game is designed to change in response to the incoming history data, and displayed contents of the liquid crystal display 7 is also designed to change. For this reason, even if the user continues remaining at a certain position, the progress of the game can be changed to an extent of being unpredictable, and the game can be made more amusing. Particularly in the case of the aforementioned pet raising game, the pet image which has been created by placing the face in is the registered image of the communicating counterpart of the user is caused to change in response to the incoming history data. This enables the game to be made more amusing. When the number of incomings from the same communicating counterpart is large, the pet image becomes similar to the communicating counterpart in many cases, and this enables the game to be made further amusing. Incidentally, in the pet raising game, instead of the pet image, other pet raising tips (for example, discipline and a nurturing method) may be changed.

In the above description, the description has been provided citing the case that a progress of game changes on a basis of incoming history data and accordingly the displaying of an image or sound output changes. In addition to the change in a progress of game, however, the CPU 3 may be caused to operate as the changing unit, and thereby standby images may be changed by use of the incoming history data. This makes the standby images change irregularly. For this reason, the portable terminal 1 becomes more convenient for a user. In addition, when a progress of game is caused to change on a basis of incoming history data, for example, graphics of characters or a battle parameter in the RPG may be changed. Also, images and sounds of scene displays in the shooting game as well as weapon displays may be changed.

Second Embodiment

Figure 9:
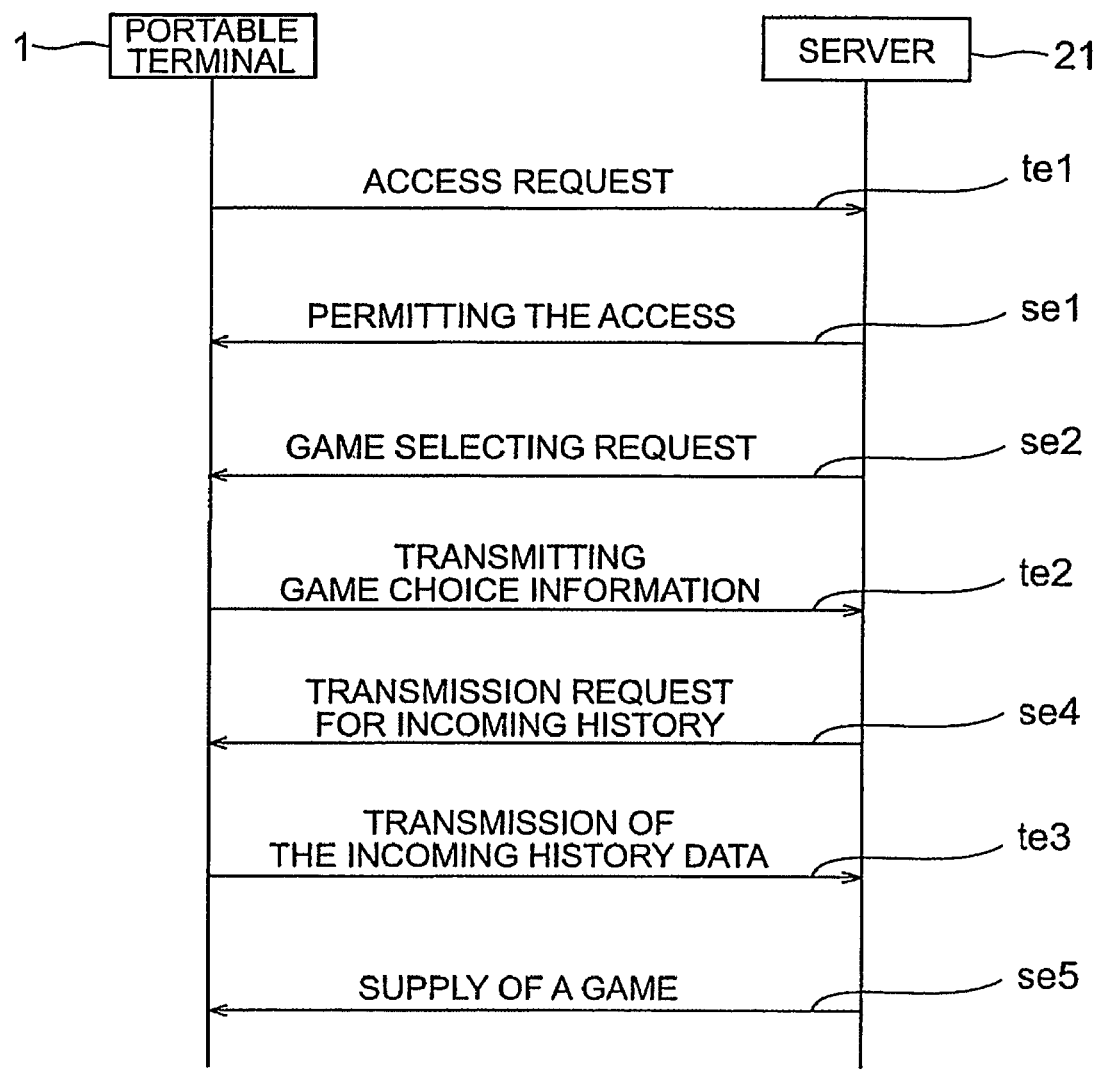
FIG. 9 is another sequence chart showing a procedure for transmitting and receiving data between the portable terminal and the server.

According to the first embodiment, the portable terminal 1 downloads game data needed for the executing of a game from the server 21, and a progress of game is caused to change by use of incoming history data. However, when a game is executed in the portable terminal 1, game data needed for the executing of the game is stored in the server 21 in some cases. In such cases, transmission and reception of the data may be made between the portable terminal 1 and the server 21 in accordance with a procedure shown in FIG. 9. FIG. 9 is a sequence chart showing a procedure for transmitting and receiving the data between the portable terminal 1 and the server 21 in a game control system 20 according to the second embodiment.

In this case, as in the case of the first embodiment, processing from a transmission te1 of a access request by the portable terminal 1 to a transmission te2 of game choice information by the portable terminal 1 is performed. Subsequently, in the server 21, when the transmission te2 of game choice information is received, the CPU 3 operates, and instructs the communication processing part 35 to transmit a transmission request se4 for incoming history data to be sent.

Then, the portable terminal 1 receives the transmission request se4 for incoming history data through the wireless communication part 11. By the reception, the CPU 3 operates to access the incoming history data storing part 14 of the data storing part 8, and to read the incoming history data which have been stored. In addition, the CPU 3 causes the wireless communication control part 10 to operate, and the communication control part 10 instructs the wireless communication part 11 to make a transmission te3 of the read incoming history data. Then, in the server 21, the following game processing is performed, and a supply se5 of a game to the portable terminal 1 is made.

Figure 14:
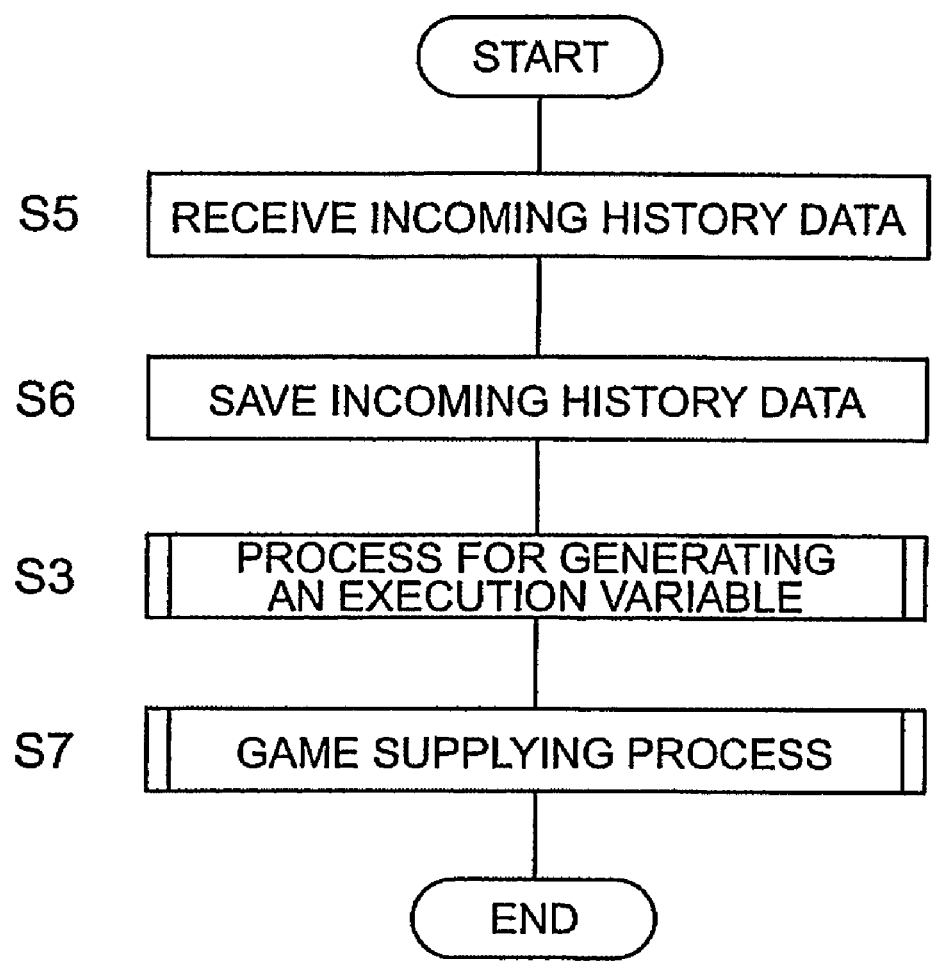
FIG. 14 is a flowchart showing an operating sequence of a game process to be performed in the server.
Figure 15:
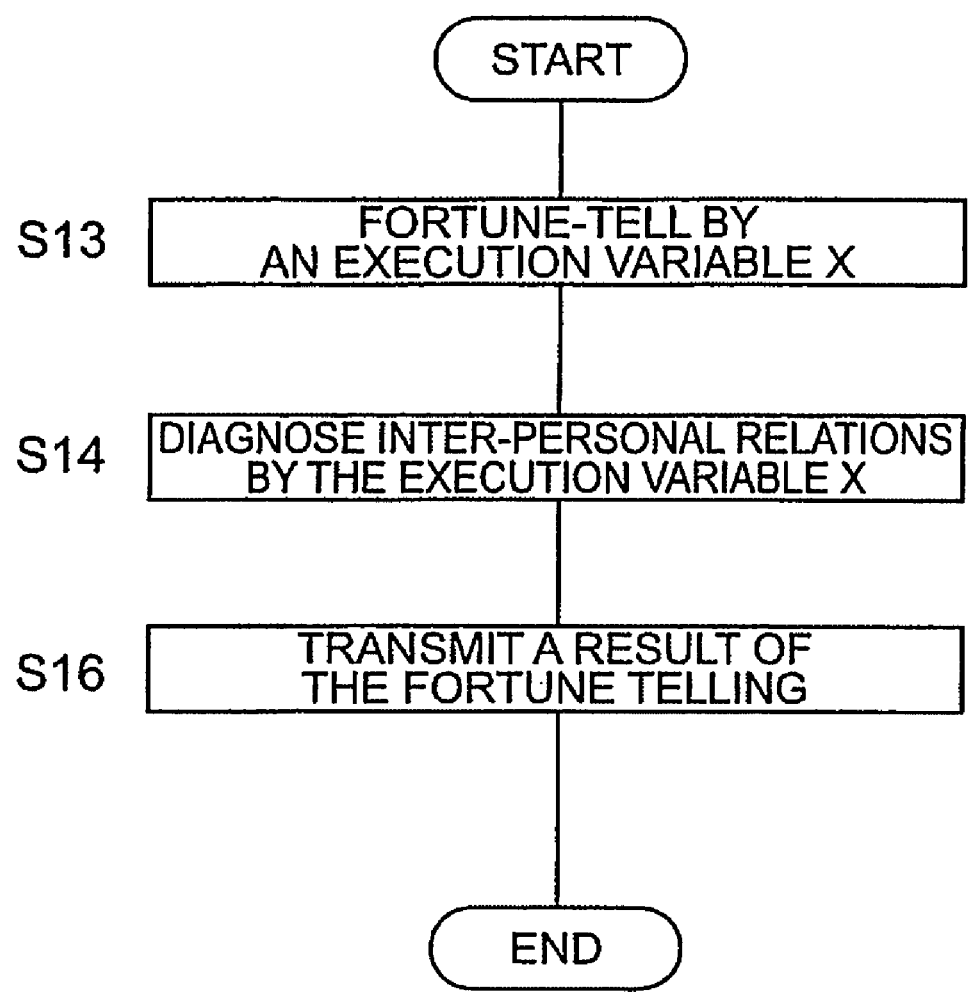
FIG. 15 is a flowchart showing an operating sequence of a game supplying process to be performed in the server.
Figure 16:
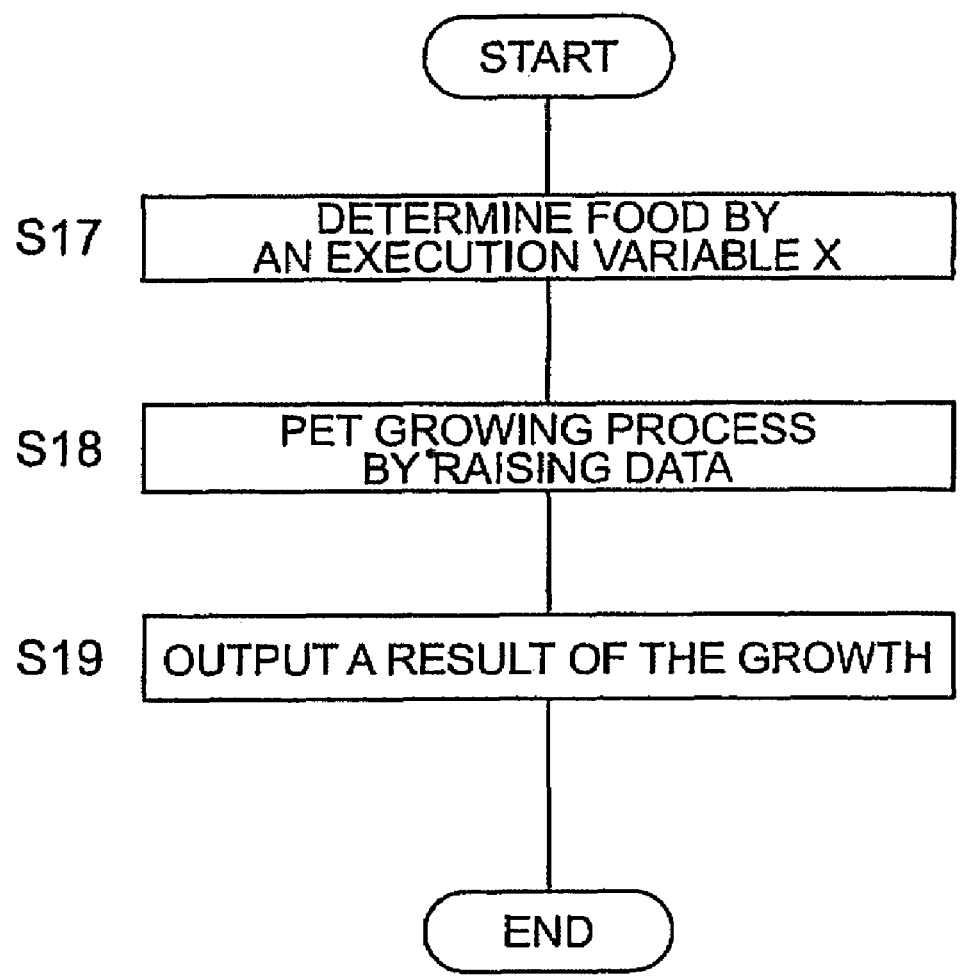
FIG. 16 is a flowchart showing an operating sequence of another a game executing process to be performed in the portable terminal.

As shown in FIG. 14, first, in the server 21, the communication processing part 35 operates to receive the incoming history data in accordance with the instruction of the CPU 31, and to acquire the incoming history data, in step 5. Incidentally, by causing reading device, which is not illustrated, to operate in accordance with an instruction of the CPU 31, the incoming history data may be acquired from a storage medium through a reading operation by the reading device. In the ensuing step 6, the data storing part 34 is accessed, and the received incoming history data is caused to be stored (saved). At this time, in the server 21, as shown in FIG. 7, the incoming history data may be rearranged (sorted) for each portable terminal code and stored.

Next, the CPU 31 operates in accordance with a game program stored in the data storing part 34, and performs a process for generating an execution variable in accordance with a flowchart shown in FIG. 12. At this time, the CPU 31 operates as extracting unit and as execution variable generating unit, and generates an execution variable X, as in the case of the CPU 3 according to the first embodiment. Subsequently, the CPU 31 proceeds to step 7, and performs a game supplying process. Once the CPU 31 starts the game supplying process, the CPU 31 performs the process in accordance with a flowchart shown in FIG. 15. Then, in step 13, the CPU 31 performs a process for fortune telling by the execution variable X, and generates a written oracle data, which constitute the fortune telling data, as in the case of the CPU 3 according to the first embodiment.

Subsequently, the CPU 31 proceeds to step 14, and performs processing as in the case of the CPU 3 according to the first embodiment. The CPU 31 performs a process for diagnosing inter-personal relations by the execution variable X, and generates inter-personal diagnosis data concerning inter-personal relations of a user as fortune telling data in response to the execution variable X. Then, the CPU 31 proceeds to step 16, the CPU 31 causes the communication processing part 35 to operate. By this, the communication processing part 35 operates as supplying device for supplying a result of the execution (diagnosis result) by transmitting the result of the execution, and transmits to the portable terminal 1 execution result data, indicating a result of the executing of a game, including fortune telling data which have been generated in steps 13 and 14. With this, the processing is completed.

On the other hand, the portable terminal 1 receives the execution result data from the server 21 is through the wireless communication part 11. Then, the CPU 3 operates as changing unit, and makes an instruction for changing the displaying of images or sound outputs in response to the fortune telling data included in the received execution result data. By this, an image corresponding to the fortune telling data is displayed on the liquid crystal display 7, or a sound corresponding to the fortune telling data is outputted from the speaker 12.

In this way, according to the present embodiment, the server 21 generates the execution variable by use of the incoming history data acquired by receiving from the portable terminal 1, and transmits to the portable terminal 1 the execution result data indicating a result of the executing of a game by use of the execution variable. In addition, the portable terminal 1 changes displays in the liquid crystal display 7 (and/or sound outputs from the speaker 12) by use of the execution result data transmitted from the server 21. For this reason, according to the present embodiment, too, in the portable terminal 1, with contents of a progress of game, a result of the executing of a game is designed to change in response to incoming history data, and displayed contents of the liquid crystal display 7 (and/or contents of sound outputs from the speaker 12) are also designed to change. Consequently, in the present embodiment as in the case of the first embodiment, even if a user continues remaining at 2 certain position, a progress of game can be changed to an extent of being unpredictable, and the game can be made more amusing.

In the aforementioned second embodiment, the incoming history data is supplied from the portable terminal 1 to the server 21. However, the incoming history data may be transmitted from a base station 22. In this case, in the base station 22, the CPU 41 operates to read the incoming history data from the incoming history data storing part 44, and to instruct the wireless communication part 46 to transmit the incoming history data.

According to the present invention, even if a current position of a user remains unchanged, a progress of game flow can be changed in the portable terminal, and a game amusing to the user can be executed.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A mobile communication terminal comprising:
a wireless communication device for wireless communication;
an image displaying device for displaying an image;
a sound outputting device for outputting sound;
execution variable generating means for generating an execution variable which changes progression of a game being played by a user of the mobile communication terminal, through the mobile communication terminal, the execution variable being generated by the execution variable generating means in a calculation based, at least in part, on incoming communications history data, the incoming communications history data including time of receipt of each incoming communication and an identifying number of each communication to the wireless communication device; and
game executing means for executing the game using the execution variable generated by the execution variable generating means to control progression of the game.

2. The mobile communication terminal according to claim 1, further comprising:
incoming communications history data storing means for storing the incoming communications history data; and
extracting means for extracting incoming conununications history data which satisfy a predetermined condition from the incoming communications history data stored in the incoming communications history data storing means, wherein the execution variable generating means generates the execution variable using the incoming communications history data extracted by the extracting means.

3. The mobile communication terminal according to claim 1, wherein the execution variable generating means generates the execution variable using a plurality of variables, at least one of which varies randomly.

4. The mobile communication terminal according to claim 1, wherein the game executing means includes:
generating means for generating, using the execution variable, fortune telling data indicating a fortune; and
changing means for generating an instruction to change the displaying of an image on the image displaying device or a sound output by the sound outputting device, using the fortune telling data generated by the generating means.

5. The mobile communication terminal according to claim 1, wherein said game executing means includes:
generating means for generating, using the execution variable, raising data for determining growth of an object to be raised; and
changing means for generating an instruction to change the displaying of an image on the image displaying device using the raising data generated by the generating means.

6. The mobile communication terminal according to claim 2, further comprising standby image changing means for changing the displaying of images on the image displaying device during a standby state, while waiting for an incoming communication, using the incoming conmunications history data that has been extracted.

7. A game server supplying a game to a mobile communication terminal connected to the game server via the Internet, the game server comprising:
acquiring means for acquiring incoming communications history data, the incoming communications history data including time of receipt of each incoming communication and an identifying number of each communication to the wireless communication device;
extracting means for extracting incoming communications history data satisfying a predetermined condition from the incoming communications history data acquired by the acquiring means;
execution variable generating means for generating an execution variable which changes progression of a game being played by a user of the mobile communication terminal, through the mobile communication terminal, the execution variable being generated by a calculation based, at least in part, on the incoming communications history data extracted by the extracting means; and
supplying means for executing the game using the execution variable generated by the execution variable generating means, and for supplying results of the execution to the mobile communication terminal.

8. A method for executing a game in a mobile communication terminal that includes a wireless communication device for wireless communication, an image displaying device for displaying an image, and a sound outputting device for outputting sound, the method comprising:
extracting incoming communications history data which satisfy a predetermined condition from incoming communications history data, the incoming communications history data being data including time of receipt of an each incoming communication and identifying number of each communication to the wireless communication device;
generating an execution variable which changes progression of a game being played by a user of the mobile communication terminal, through the mobile communication terminal, the execution variable being generated by a calculation based, at least in part, on the incoming communications history data; and
executing the game using the execution variable generated.

9. The mobile communication terminal according to claim 1, wherein the incoming communications history data further includes at least one of:
telephone number of the caller of the incoming telephone call,
whether the incoming telephone call came from an overseas telephone, a cellular telephone, or a public telephone, and
whether the telephone number of the incoming telephone call is hidden.

10. The game server according to claim 7, wherein the incoming communications history data further includes at least one of
telephone number of the caller of the incoming telephone call,
whether the incoming telephone call came from an overseas telephone, a cellular telephone, or a public telephone, and
whether the telephone number of the incoming telephone call is hidden.

11. The method for executing a game according to claim 8, wherein the incoming communications history data further includes at least one of:
telephone number of the caller of the incoming telephone call,
whether the incoming telephone call came from an overseas telephone, a cellular telephone, or a public telephone, and
whether the telephone number of an incoming telephone call is hidden.

* * * * *